Patented June 6, 1939

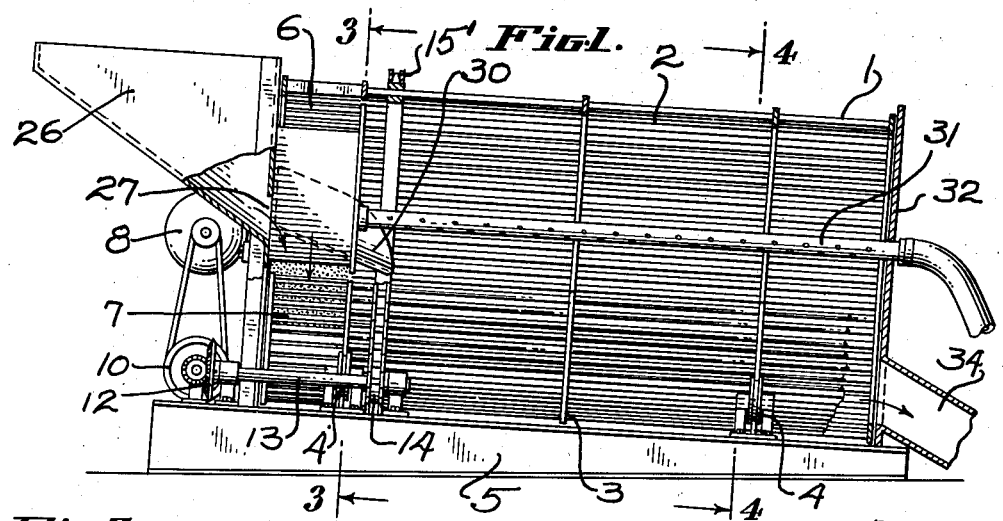

2,161,032

UNITED STATES PATENT OFFICE 2,161,032

WALNUT HULLER

William E. Formway, Los Altos, Calif.

Application January 31, 1939, Serial No. 253,789

5 Claims. (Cl. 146—8)

My invention relates to walnut hullers, and more particularly to walnut hullers adapted for continuous operation.

Among the objects of my invention are: To provide a walnut huller of high capacity; to provide a walnut huller of relatively few parts; to provide a combined walnut huller and washer; to provide a walnut huller adjustable for the handling of nuts of varying diameters; to provide a walnut huller having a nonrotating brush; and to provide a simple and efficient walnut huller and washer.

Other objects of my invention will be apparent or will be specifically pointed out in the description forming a part of this specification, but I do not limit myself to the embodiment of the invention herein described, as various forms may be adopted within the scope of the claims.

Referring to the drawing:

Fig. 1 is a side view, partly in section and partly in elevation, of one preferred form of walnut huller embodying my invention.

Fig. 2 is an input end view of the huller shown in Fig. 1.

Fig. 3 is a cross-sectional view, partly in elevation, taken as indicated by the line 3—3 in Fig. 1.

Fig. 4 is a sectional view, taken as indicated by the line 4—4 in Fig. 1.

Fig. 5 is a sectional view of sharpened cutter bars.

Referring directly to the drawing for a more detailed description of my invention, a cylindrical cage 1, formed for the greater part of its length of spaced round rods 2 held together by peripheral bands 3, is mounted to rotate by supporting several peripheral bands on rollers 4, these rollers being mounted on a slanted bed 5.

The input end of the cage is provided with an input section 6 formed, not from round bars 2, as is the remainder of the cage, but from flat parallel cutter bars 7 positioned radially to present their smallest dimension to the interior of the cage. These cutter bars may be sharpened to present cutting edges to the nut hulls, as shown in Fig. 5. The cage is rotated by motor 8 positioned on motor frame 9, this motor driving, through pulleys 10, belt 11 and gears 12, cage 1; main drive shaft 13 carrying a chain pinion 14 engaging a chain 15' passing entirely around the cage.

Within input portion 6 of cage 1 is positioned a non-rotating brush comprising a center brush section 15 and lateral brush sections 16, each lateral brush 16 being joined to center brush 15 by a hinge 17. Each brush section may be curved to approximate the general but not exact curvature of the inside of the cage, and center brush section 15 is provided with a central boss 19 fitting into the interior of a stationary cylinder 20 mounted on the back of motor frame 9 by attachment to stationary pins 21 through ears 22. Each pin 21 is connected to each lateral brush 16 through a toggle bar 23 pivoted to the pins 21, the angle formed by the two toggles being directed slightly toward the brushes.

An adjustment screw 24 is provided passing through the axis of the cylinder, and is threaded through boss partition 25. A spring 24' inside the cylinder allows the entire brush assembly as a whole to float upwardly away from the interior surfaces of bars 7 when nuts are passed between the bars and the brush sections, whereas the rotation of adjustment screw 24 will pull the entire brush assembly away from or toward the interior surfaces of the bars, thus allowing adjustment for different sized nuts without disturbing the floating action. The toggle action of the toggle bars 23 pulls the ends of lateral brush section 16 toward the axis of the cage when the brushes are pulled away from the bars, thus roughly preserving parallel curvatures. If, for example, the three brushes were to be mounted as a unit on a solid foundation, drawing the brushes away from the cutter bars would not greatly change the distance of the brush from the bars at the ends of the brushes, but would only change this distance at the center of the brush.

Thus, I have provided a means of adjusting a generally curved stationary brush which will maintain proper hulling spacings throughout the run of the brush. While I have shown three brushes hinged together it will be obvious to those skilled in the art that a full equivalent is the mounting of the brush bristles on a continuously flexible backing, but I have found that it is easier to replace brushes and to handle the machine in the field by splitting the brush into sections.

To feed the nuts into the space between the brush and the cutter bars, I provide a hopper 26 provided with an outlet 27 just above the junction of the free end of one of the lateral brush sections 16, and direct nuts into the space between the brush and the bars by slide 28 within the cage. When the cage is rotating the nuts are picked up by the bars, are forced beneath the brush, and are carried around against the pressure of spring 24' to the free end of opposite brush section 16. As the nuts roll between the cutter bars and the bristles of the brush sections, the cutter bars break through the hull, the friction separates the hulls from the nuts, and these hulls drop through the cutter bars into hull chute 29 which extends beneath the cutter bars and also beneath the remainder of the cage.

After the nuts have passed by all of the brush sections, they are rolled out by action of the rotating cage into a nut chute 30 which directs the nuts into the remainder of the cage. Here, the nuts are tumbled by the rotation of the cage and gradually, because of the inclination of the cage, travel to the far end of the cage, meanwhile being sprayed with water from an interior water pipe 31. Any hulls, dirt, leaves, etc. removed during the washing process also drop into hull chute 29. The far end of the cage is blocked by a stationary end plate 32, this end plate being provided with an output aperture 33 allowing the nuts to pass into a nut discharge chute 34 for whatever further processing may be necessary.

It will thus be seen that by providing a stationary brush in a rotating cage, I have greatly simplified the structure of the huller, and I am able to provide an easily adjustable relationship between brush and cutter bars, to the end that a satisfactory hulling action may occur at all adjustments throughout the brush run of the nuts.

I claim:

1. A nut huller comprising a hollow cylindrical hulling cage formed of longitudinally positioned spaced cutter bars, means for rotating said cage, a stationary brush positioned inside of said cage and having bristles thereon extending toward and spaced from the inner edges of said cutter bars, said brush opposing a substantial arc of said cage, means for adjusting the average distance of the bristle ends from said inner ends of said cutter bars, and simultaneously changing the curvature of said brush to maintain the arc of said brush substantially equidistant from the interior arc of said cage, means for rotating said cage, and means for introducing nuts to be hulled at one end of said brush in the direction of cage rotation.

2. A nut huller as recited in claim 1, with an additional open bar cage forming a continuation of said hulling cage, and means for directing nuts having passed between said cutter bars and said brush into said additional cage.

3. Apparatus as recited in claim 1, wherein the brush is divided into three hinged sections, and wherein means are provided to change the angle of each brush section with the other brush sections as the said average distance is changed.

4. Apparatus as recited in claim 1, wherein the brush is provided with a resilient means forcing said brush against nuts entering between the brush and cage.

5. A nut huller comprisng a rotating cage having spaced longitudinal cutter bars, a stationary brush following the interior arc of said cutter bars and spaced therefrom, resilient means forcing brush against nuts entering between said brush and said cutter bars, and means for rotating said cage.

WILLIAM E. FORMWAY.